United States Patent
Hu et al.

(10) Patent No.: US 9,815,910 B2
(45) Date of Patent: Nov. 14, 2017

(54) SURFACE MODIFICATION OF CELLULOSE NANOCRYSTALS

(71) Applicant: McMaster University, Hamilton (CA)

(72) Inventors: Zhen Hu, Hamilton (CA); Emily Cranston, Dundas (CA)

(73) Assignee: MCMASTER UNIVERSITY, Hamilton (CA)

( * ) Notice: Subject to any disclaimer, the term of this patent is extended or adjusted under 35 U.S.C. 154(b) by 0 days.

(21) Appl. No.: 14/745,929

(22) Filed: Jun. 22, 2015

(65) Prior Publication Data

US 2015/0368367 A1    Dec. 24, 2015

Related U.S. Application Data

(60) Provisional application No. 62/014,740, filed on Jun. 20, 2014.

(51) Int. Cl.

| | | |
|---|---|---|
| *C08L 1/00* | (2006.01) | |
| *C08B 15/00* | (2006.01) | |
| *C08B 15/08* | (2006.01) | |
| *C08J 7/12* | (2006.01) | |
| *C08K 9/04* | (2006.01) | |

(52) U.S. Cl.
CPC .............. *C08B 15/00* (2013.01); *C08B 15/08* (2013.01); *C08J 7/12* (2013.01); *C08K 9/04* (2013.01)

(58) Field of Classification Search
CPC . C08B 15/00; C08B 15/08; C08J 7/12; C08K 9/04
See application file for complete search history.

(56) References Cited

U.S. PATENT DOCUMENTS

2013/0264732 A1* 10/2013 Youngblood ........... B29C 41/24
                                                     264/28
2014/0272013 A1*  9/2014 Zhao .................... C09D 101/02
                                                     426/100

OTHER PUBLICATIONS

Hu, Zhen (Justin) et al., "Hydrophobic Surface Functionalization of Cellulose Nanocrystals for Composites and Non-aqueous Formulation Products", presentation, McMaster University, May 8, 2015.
Kan, K.H., Li, J., Wijesekera, K., Cranston, E.D. "Polymer-Grafted Cellulose Nanocrystals as pH-responsive reversible flocculants". Biomacromolecules. 2013, 14, 3130-3139.
Camarero, Espinosa, S., Kuhnt, T., Foster, E.J., Weder, C. "Isolation of Thermally Stable Cellulose Nanocrystals by Phosphoric Acid Hydrolysis". Biomacromolecules. 2013, 14, 1223-1230.
Abitbol, T., Marway, H., Cranston, E.D. "Surface Modification of Cellulose Nanocrystals with Cetyltrimethylammonium Bromide". NPPJ. 2014, 29, 46-57.

(Continued)

*Primary Examiner* — Alexander Polyansky
(74) *Attorney, Agent, or Firm* — Bereskin & Parr LLP/S.E.N.C.R.L., s.r.l.; Patricia Folkins

(57) ABSTRACT

Hydrophobic CNCs were successfully prepared by grafting amine- and thiol terminated hydrocarbons to CNCs that have been previously coated with plant polyphenols. Hydrocarbons of various chain lengths can be used to tune the hydrophobicity of the modified CNCs. After the surface modification process, CNCs can be easily redispersed in nonpolar solvents highlighting the potential of the hydrophobic CNCs in, for example, CNC reinforced nanocomposites and non-aqueous formulations.

20 Claims, 4 Drawing Sheets

(56) References Cited

OTHER PUBLICATIONS

Habibi, Y., Chanzy, H., Vignon, M. "TEMPO-Mediated Surface Oxidation of Cellulose Whiskers". Cellulose. 2006, 13, 679-687.

Hasani, M., Cranston, E.D., Westman, G., Gray, D.G. "Cationic Surface Functionalization of Cellulose Nanocrystals". Soft Matter. 2008, 4, 2238-2244.

Gousse, C., Chanzy, H., Excoffier, G., Soubeyrand, L., Fleury, E. "Stable Suspensions of Partially Silylated Cellulose Whiskers Dispersed in Organic Solvents". Polymer. 2002, 43, 2645-2651.

Siqueira, G., Bras, J., Dufresne, A. "Cellulose Whiskers Versus Microfibrils: Influence of the Nature of the Nanoparticle and its Surface Functionalization on the Thermal and Mechanical Properties of Nanocomposites". Biomacromolecules. 2008, 10, 425-432.

Zoppe, J.O., Habibi, Y., Rojas, O.J, Venditti, R. A., Johansson, L.S., Efimenko, K., Osterberg, M., Laine, J. "Poly(N-isopropylacrylamide) Brushes Grafted from Cellulose Nanocrystals via Surface-Initiated Single-Electron Transfer Living Radical Polymerization". Biomacromolecules. 2010, 11, 2683-2691.

Salajkova, M., Berglund, L.A., Zhou, Q. "Hydrophobic Cellulose Nanocrystals Modified with Quaternary Ammonium Salts". J. Mater. Chem. 2012, 22, 19798-19805.

* cited by examiner

SURFACE MODIFICATION OF CELLULOSE NANOCRYSTALS

CROSS-REFERENCE TO RELATED APPLICATIONS

The present application claims the benefit of priority from U.S. Provisional Patent Application Ser. No. 62/014,740 filed on Jun. 20, 2014, the contents of which are incorporated by reference in their entirety.

FIELD

The present application relates to methods of modifying the surface of cellulose nanocrystals. In particular, the present application relates to hydrophobic cellulose nanocrystals, methods for their preparation and use, for example, in CNC reinforced nanocomposites and non-aqueous formulations.

BACKGROUND

In recent years, cellulose nanocrystals (CNCs) have attracted significant attention not only because of their renewable source and biodegradability but also because of their low density, high aspect ratio, high tensile strength, and unique optical properties.[1-3] Also known as nanocrystalline cellulose or cellulose whiskers, CNC particles can be produced from a variety of natural cellulose sources and have dimensions of a few nanometers wide by hundreds of nanometers long. CNCs are generally isolated by acid hydrolysis which removes the amorphous regions of cellulose and leaves behind the highly crystalline regions that are less accessible to acid degradation. Aqueous CNC suspensions can be colloidally stable in water because of surface charged sulfate half ester, carboxylate or phosphate ester groups, depending on the acid hydrolysis method.[4] CNCs are now being produced in industrially relevant quantities in both Canada and the USA and are currently being evaluated in a variety of applications including as reinforcing materials in nanocomposites;[5] as stabilizers for emulsions and foams;[6] and, as components of drilling fluids.[7]

Major challenges in using CNCs in commercial products include the ability to disperse the nanoparticles in various materials (both liquids and solids) due to the hydrophilicity of CNCs. Functionalization of the surface of the nanoparticles helps to avoid irreversible agglomeration and aggregation in nonpolar matrices.[8] CNCs can be dispersed in nonaqueous media using surfactants or surface chemical grafting through hydroxyl substitution reactions. Use of surfactants is a straightforward method, but a large amount of surfactant is normally required and it has been shown to be rather challenging to disperse modified CNCs in nonpolar solvents like toluene.[9] On the other hand, surface chemical grafting, generally involves reactions with the hydroxyl groups on the CNCs surface. Previously reported surface modifications include esterification, sulfonation, oxidation,[10] cationization,[11] silylation,[12] polymer grafting,[13] and so on.[14] Steric stabilization with surface-grafted polymer brushes has been particularly effective in improving the stability and dispersibility of CNCs in nonpolar solvents and polymer matrices.[15] Unfortunately, these reactions are generally performed in organic media where CNCs are unstable and aggregate, and/or are tedious and lengthy processes.[16] Therefore, there is a need for a simple, environmentally friendly and low-cost method for producing hydrophobic cellulose nanocrystals (H-CNCs).

Phenols and polyphenols are widely distributed in plant tissues, where they are involved in diverse biological functions such as structural support, pigmentation, chemical defense, and prevention of radiation damage.[17] Plant polyphenols display a rich and complex spectrum of physical and chemical properties, leading to broad chemical versatility including adsorption of UV radiation, radical scavenging, and metal ion complexation. The high dihydroxyphenyl (catechol) and trihydroxyphenyl (gallic acid, GA) content of plant polyphenols recently received much attention in the context of nanoparticle surface modification, as catechols are known to strongly bind to surfaces through covalent and noncovalent interactions[18] and are prominent constituents of marine polyphenolic protein adhesives.[19] The covalent reactions between polyphenol coating on nanoparticle surfaces and nucleophilic groups of polypeptides and other molecules were exploited recently to introduce antifouling functionality.[20-21]

SUMMARY

In the present application, hydrophobic CNCs prepared from the grafting of amine-terminated hydrocarbons to CNCs that have been previously coated with plant polyphenols are reported. By varying chain lengths of the amine- and/or thiol-terminated hydrocarbons allows for tuning the hydrophobicity of the modified CNCs. The resulting hydrophobic CNCs can easily be re-dispersed in an organic solvent with greater interfacial compatibility with hydrophobic systems, highlighting their potential in, for example, CNC reinforced nanocomposites and non-aqueous formulations.

Accordingly, in some embodiments, the present application includes a method of preparing hydrophobic cellulose nanocrystals (CNCs) comprising:
  a) combining CNCs with one or more plant polyphenols in an aqueous suspension under conditions to provide polyphenol-coated CNCs;
  b) combining the polyphenol-coated CNCs with one or more hydrocarbons selected from an amine-terminated hydrocarbon and a thiol-terminated hydrocarbon under conditions to provide hydrophobic CNCs; and
  c) optionally, isolating the hydrophobic CNCs.

In some embodiments, the present application includes a method for the surface modification of CNCs comprising:
  a) combining the hydrophobic CNCs prepared as described herein with one or more surface functionalization reagents in one or more organic solvents under conditions to provide surface modified CNCs.

In some embodiments, the present application includes a hydrophobic CNC composition comprising CNCs coated with a plant polyphenol to which has been grafted one or more hydrocarbons selected from an amine-terminated hydrocarbon and a thiol-terminated hydrocarbon.

In some embodiments, the present application includes all uses of the hydrophobic CNCs of the application, such as for, example, CNC reinforced nanocomposites and non-aqueous formulations.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

DRAWINGS

The embodiments of the application will now be described in greater detail with reference to the attached drawings in which.

Figure 4:
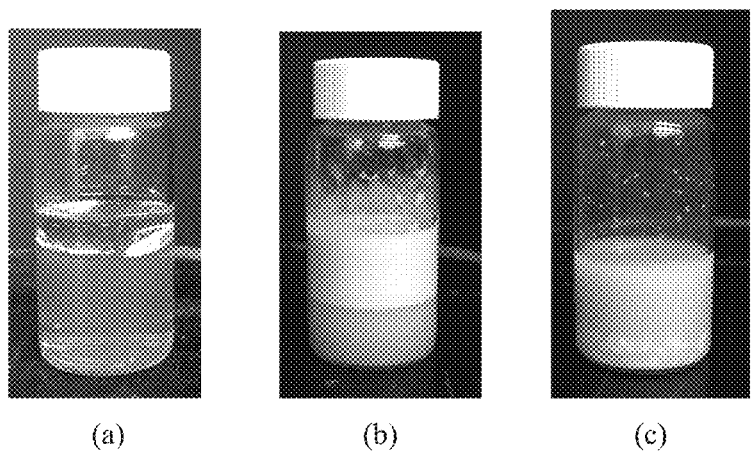

FIG. 4 shows an exemplary embodiment of the application in which a biphasic preparation system is used. In this embodiment toluene was added to the tannic acid coated CNCs to form a biphasic system (a), then decylamine is added (b) and the top organic phase was separated and washed with water. Toluene was added to the separated organic phase and the mixture vortexed or sonicated and the hydrophobic CNCs were obtained by isolating the supernatant of the mixture upon centrifugation (d).

DETAILED DESCRIPTION

I. Definitions

Unless otherwise indicated, the definitions and embodiments described in this and other sections are intended to be applicable to all embodiments and aspects of the present application herein described for which they are suitable as would be understood by a person skilled in the art.

As used in this application and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used in this application and claim(s), the word "consisting" and its derivatives, are intended to be close ended terms that specify the presence of stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The terms "about", "substantially" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The present description refers to a number of chemical terms and abbreviations used by those skilled in the art. Nevertheless, definitions of selected terms are provided for clarity and consistency.

As used in this application, the singular forms "a", "an" and "the" include plural references unless the content clearly dictates otherwise. For example, an embodiment including "a polyphenol" should be understood to present certain aspects with one compound or two or more additional compounds.

In embodiments comprising an "additional" or "second" component, such as an additional or second polyphenol, the second component as used herein is chemically different from the other components or first component. A "third" component is different from the other, first, and second components, and further enumerated or "additional" components are similarly different.

The term "and/or" as used herein means that the listed items are present, or used, individually or in combination. In effect, this term means that "at least one of" or "one or more" of the listed items is used or present.

The term "suitable" as used herein means that the selection of the particular compound or conditions would depend on the specific synthetic manipulation to be performed, and the identity of the molecule(s) to be transformed, but the selection would be well within the skill of a person trained in the art. All process/method steps described herein are to be conducted under conditions sufficient to provide the product shown. A person skilled in the art would understand that all reaction conditions, including, for example, reaction solvent, reaction time, reaction temperature, reaction pressure, reactant ratio and whether or not the reaction should be performed under an anhydrous or inert atmosphere, can be varied to optimize the yield of the desired product and it is within their skill to do so.

The term "coated", for example "polyphenol-coated", as used herein refers to a substrate having a surface that has been substantially covered with substance to provide a layer or covering to the substrate. For example, the plant polyphenol substance described herein is understood to substantially cover the CNCs to provide the polyphenol-coated CNCs.

The term "hydrophobic" as used herein with reference to CNCs means CNCs that have a contact angle, for example as measured using a Krüss Drop Shape Analysis System, that is greater than about 20 degrees (the native CNC contact angle). Hydrophobic CNCs generally disperse, or form suspensions in, organic solvents.

The term "polyphenol" as used herein refers to substances that contain more than one phenolic hydroxyl group.

The term "hydrocarbon" as used herein refers to a compound comprising carbon and hydrogen atoms.

The term "terminated", as in "amine-terminated" and "thiol-terminated", means that at least one end of a hydrocarbon compound is functionalized with an amine ($NH_2$) or thiol (SH) group that is accessible and therefore able to participate in chemical interactions, such as hydrogen bonding, ionic bonding and/or covalent bonding, with complementary functional groups.

The term "alkyl" as used herein refers to a straight or branched chain saturated hydrocarbon group.

The term "aryl" as used herein refers to a group comprising at least one phenyl group. Aryl compounds include, for example, phenyl, benzyl, napthyl, indanyl, naphthylmethyl and the like.

The term "cellulose nanocrystals" of "CNCs" as used herein refers to singular members of the family of cellulosic nanomaterials, having a high degree of crystallinity, a high degree of short range order, and consisting of >99% pure cellulose. Wood-based cellulose nanocrystals are typically 100 to 200 nm in length and 5 to 10 nm in cross-section. Nanocrystals from sources other than wood may have lengths up to several microns and cross-section typically less than 50 nm. Wood-based CNCs contain neither hemicelluloses nor lignin.

II. Methods of the Application

In some embodiments, the present application includes a method of preparing hydrophobic CNCs by grafting amine- or thiol-terminated hydrocarbons to CNCs that have been previously coated with plant polyphenols. The varying chain lengths of the amine- or thiol-terminated hydrocarbons allow for tuning the hydrophobicity of the modified CNCs. The resulting hydrophobic CNCs can easily be redispersed in organic solvents.

Accordingly, the present application includes a method of preparing hydrophobic cellulose nanocrystals (CNCs) comprising:
  a) combining CNCs with one or more plant polyphenols in an aqueous suspension under conditions to provide polyphenol-coated CNCs;
  b) combining the polyphenol-coated CNCs with one or more hydrocarbons selected from an amine-terminated hydrocarbon and a thiol-terminated hydrocarbon under conditions to provide hydrophobic CNCs; and
  c) optionally, isolating the hydrophobic CNCs.

In some embodiments, the plant polyphenol is selected from tannic acid, aepigallocatechin gallate (EGCG), epicatechin gallate (ECG), epigallocatechin (EGC), gallic acid (GA) and pyrogallol (PG), and mixtures thereof. In another embodiment, the plant polyphenol is tannic acid. In another embodiment, the plant polyphenol is gallic acid.

In some embodiments, the conditions to provide polyphenol coated CNCs comprise one or more of:
(a) use of about 0.5 wt % to about 5 wt %, about 1 wt % to about 3 wt %, or about 2 wt % suspension of CNCs in water;
(b) adjusting the ionic strength of the aqueous CNC using a suitable buffer, such as 2-[4-(2-hydroxyethyl)piperazin-1-yl]ethanesulfonic acid (HEPES);
(c) use of a weight ratio of CNCs:polyphenol of from about 5:1 to about 50:1, about 10:1 to about 30:1 or about 20:1;
(d) combining CNCs with one or more plant polyphenols at about room temperature and stirring for about 1 hour to about 24 hours, about 3 hours to about 18 hours, or about 6 hours to about 12 hours; and
(e) adjusting the pH of the suspension after addition of the plant polyphenols to about 7 to about 9, about 7.5 to about 8.5 or about 8 using a base such as sodium hydroxide.

In some embodiments, the conditions to provide hydrophobic CNCs comprise one or more of:
(a) use of a weight ratio of CNCs:hydrocarbon of about 0.5:1 to about 10:1, about 1:1 to about 5:1 or about 2:1 to about 3.5:1; and
(b) combining the hydrocarbon with the aqueous suspension comprising polyphenol-coated CNCs at about room temperature and stirring for about 1 minute to about 24 hours, about 5 minutes to about 12 hours, or about 30 minutes to about 6 hours.

In some embodiments, the conditions to provide hydrophobic CNCs comprise one or more of:
(a) adding an organic, hydrophobic solvent to the aqueous suspension comprising polyphenol-coated CNCs at about room temperature to provide a biphasic system comprising an organic phase and an aqueous phase;
(b) use of a weight ratio of CNCs:hydrocarbon of about 0.5:1 to about 10:1, about 1:1 to about 5:1 or about 2:1 to about 3.5:1; and
(c) combining the hydrocarbon with the biphasic system comprising polyphenol-coated CNCs at about room temperature and stirring for about 1 minute to about 24 hours, about 5 minutes to about 12 hours, or about 30 minutes to about 6 hours (monophasic system).

In some embodiments, isolating the hydrophobic CNCs from the monophasic system is performed using centrifugation or filtration. In some embodiments, isolating the hydrophobic CNCs from the biphasic system is performed by separating the organic phase from the aqueous phase, washing the organic phase with an aqueous-based solvent such as water, adding an organic hydrophobic solvent to the organic phase, separating the solids, for example by filtration or vortexing and collecting the organic phase. In some embodiments, the organic hydrophobic solvent is selected from hexanes, heptane, toluene, chloroform, ethanol and methyl ethyl ketone and mixtures thereof.

In some embodiments, the hydrocarbon is selected from one or more of an amine-terminated alkyl, a thiol-terminated alkyl, an amine-terminated aryl and a thiol-terminated aryl. In some embodiments, the hydrocarbon is selected from one or more of amine-terminated $C_{9-17}$alkyl, thiol-terminated $C_{9-17}$alkyl, amine-terminated $C_{6-20}$aryl and thiol-terminated $C_{6-20}$aryl. In some embodiments, the hydrocarbon is selected from one or more of amine-terminated $C_{9-13}$alkyl, thiol-terminated $C_{9-13}$alkyl amine-terminated $C_{6-14}$aryl and thiol-terminated $C_{6-14}$aryl. In some embodiments, the hydrocarbon is selected from decylamine, undecylamine, dodecylamine, decylthiol, undecylthiol, dodecylthiol, benzylamine and benzylthiol, and mixtures thereof. In yet a further embodiment, the amine-terminated hydrocarbon is a decylamine.

In some embodiments, the present application includes a method for the surface modification of CNCs comprising:
  a) combining the hydrophobic CNCs prepared as described herein with one or more surface functionalization reagents in one or more organic solvents under conditions to provide surface modified CNCs.

In some embodiments, the one or more functionalization reagents reagents are selected from reagents to perform an esterification, sulfonation, oxidation, cationization, sylation and/or polymer grafting.

In some embodiments, the one or more organic solvents are selected from hexanes, heptane, toluene, chloroform, ethanol and methyl ethyl ketone and mixtures thereof.

In some embodiments, the organic solvent is toluene.

III. Hydrophobic CNCs of the Application

In some embodiments, the present application includes a hydrophobic CNCs prepared using a method as described herein.

In some embodiments, the present application includes a hydrophobic CNC composition comprising CNCs coated with a plant polyphenol to which has been grafted one or more hydrocarbons selected from an amine-terminated hydrocarbon and a thiol-terminated hydropcarbon.

In some embodiments, the plant polyphenol is selected from tannic acid, aepigallocatechin gallate (EGCG), epicatechin gallate (ECG), epigallocatechin (EGC), gallic acid (GA) and pyrogallol (PG), and mixtures thereof. In another embodiment, the plant polyphenol is tannic acid. In another embodiment, the plant polyphenol is gallic acid.

In some embodiments, the hydrocarbon is selected from one or more of an amine-terminated alkyl, a thiol-terminated alkyl, an amine-terminated aryl and a thiol-terminated aryl. In some embodiments, the hydrocarbon is selected from one or more of amine-terminated $C_{9-17}$alkyl, thiol-terminated $C_{9-17}$alkyl, amine-terminated $C_{6-20}$aryl and thiol-terminated $C_{6-20}$aryl. In some embodiments, the hydrocarbon is selected from one or more of amine-terminated $C_{9-13}$alkyl, thiol-terminated $C_{9-13}$alkyl amine-terminated $C_{6-14}$aryl and thiol-terminated $C_{6-14}$aryl. In some embodiments, the hydrocarbon is selected from decylamine, undecylamine, dodecylamine, decylthiol, undecylthiol, dodecylthiol, benzylamine and benzylthiol, and mixtures thereof. In yet a further embodiment, the amine-terminated hydrocarbon is a decylamine.

The resulting hydrophobic CNCs can easily be re-dispersed in an organic solvent with greater interfacial compatibility with hydrophobic solvents, highlighting their potential in, for example, CNC reinforced nanocomposites and non-aqueous formulations.

EXAMPLES

The following non-limiting examples are illustrative of the present application:
Materials:

Cellulose nanocrystal (CNC) dry powder was obtained from CelluForce (QC, Canada). Octylamine, decylamine, dodecylamine, octadecylamine, toluene, tannic acid, gallic acid, dodecanethiol, and 2-[4-(2-hydroxyethyl)piperazin-1-yl]ethanesulfonic acid (HEPES) were all purchased from Sigma-Aldrich.

Figure 1:
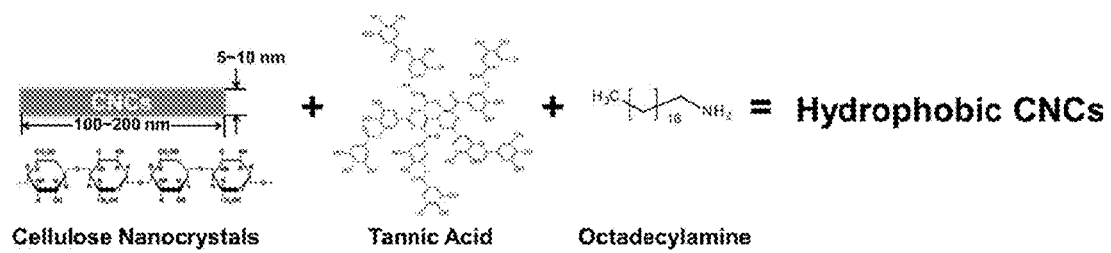
FIG. 1 shows a schematic diagram of the hydrophobic surface modification of cellulose nanocrystals with tannic acid and octadecylamine in an exemplary embodiment of the application. Simple mixing of the components in water, in sequence, leads to hydrophobic cellulose nanocrystals.
Figure 2:
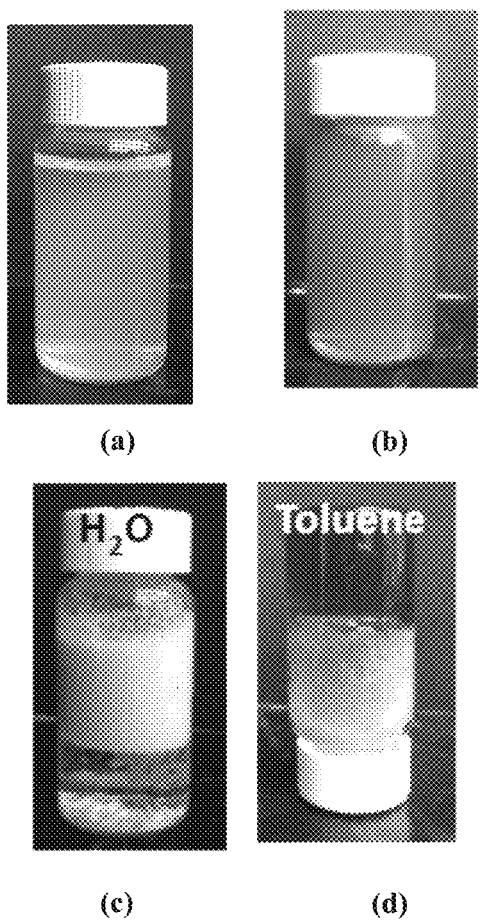
FIG. 2 shows an exemplary embodiment of the application in which (a) CNCs were first suspended in water; (b) tannic acid was added to the suspension in (a) and the pH adjusted to 8.0; (c) decylamine was added to the tannic acid coated CNCs in (b); and (d) the dispersion of the hydrophobic CNCs in toluene.

Example 1(a): CNC Surface Modification with Tannic Acid (TA) and Decylamine 400 mg dry CNC powder was added to 20 mL deionized water to prepare 2 wt. % CNC suspension (FIG. 2a). The ionic strength of CNC suspension was adjusted by adding HEPES powder (20 mM). Tannic acid (20 mg) was then added to the suspension and the pH was adjusted to 8.0 with NaOH. The resulting mixture was stirred for 6-12 hours using magnetic stirring at room temperature (FIG. 2b). Decylamine (1 mL) was then added and the resulting mixture stirred for 30 min (the reaction was visibly very fast, i.e., within 1 min) (FIG. 2c). Aggregated CNC particles were obtained through centrifugation (500 rpm) or vacuum filtration. Several cycles of rinsing the collected CNC particles with water and centrifugation were used to purify the sample. Purified CNC particles were dried with oven-drying (60° C. for 24 h), freeze-drying, or spray-drying. Dry CNC particles can then be dispersed in different organic solvents such as heptane, toluene (FIG. 2d), chloroform, ethanol, and methyl ethyl ketone (MEK).

Figure 3:
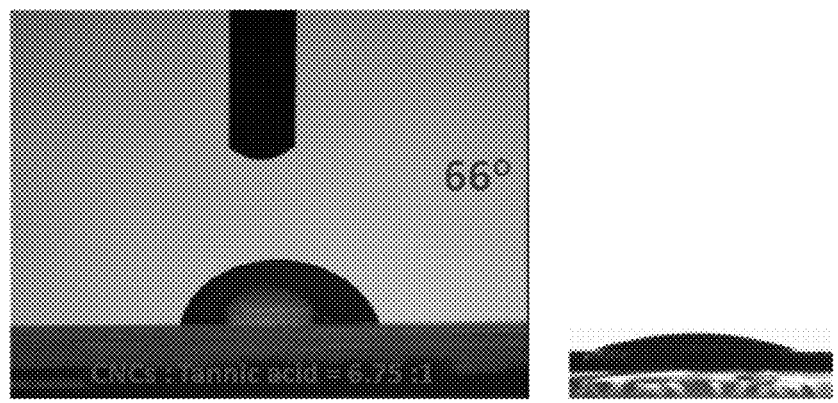
FIG. 3 shows the static contact angle Krüss Drop Shape Analysis of the decylamine/tannic acid hydrophobic CNC's compared to unmodified CNCs in an exemplary embodiment of the present application.

A toluene suspension of modified hydrophobic CNCs (1 wt. %) was added onto a silicon wafer substrate and dried upon ambient condition. The static contact angle measurements were performed using a Krüss Drop Shape Analysis System DSA10 (Hamburg, Germany) instrument at room temperature (22±2° C.) (FIG. 3). A contact angle of 66° demonstrates that modified CNC particles are more hydrophobic than unmodified CNC particles (right in FIG. 3).

(b) Using like conditions hydrophobic CNCs were prepared from tannic acid-primed CNCs followed by grafting of octylamine, dodecylamine and octadecylamine Optimal results for dispersion in toluene were obtained with decylamine and dodecylamine.

Example 2: CNC Surface Modification with Gallic Acid (GA) and Dodecanethiol 400 mg dry CNC powder was added to 20 mL deionized water to prepare a 2 wt. % CNC suspension. The ionic strength of CNC suspension was adjusted by adding HEPES powder (20 mM). Gallic acid (20 mg) was then added to the suspension and the pH was adjusted to 8.0 with NaOH. The resulting mixture was stirred for 6-12 hours with magnetic stirring at room temperature. Dodecanethiol (1 mL) was then added and the resulting mixture stirred for 24 hour. Aggregated CNC particles were obtained through centrifugation (500 rpm) or vacuum filtration. Several cycles of rinsing collected CNC particles with water and centrifugation were used to purify the sample. Purified CNC particles were dried with oven-drying (60° C. for 24 h), freeze-drying, or spray-drying. Dry CNC particles can then be dispersed in different organic solvents such as heptane, toluene, chloroform, ethanol, and methyl ethyl ketone (MEK).

Example 3: CNC Surface Modification with Tannic Acid (TA) and Decylamine Through Phase Transfer Method 400 mg dry CNC powder was added to 20 mL deionized water to prepare a 2 wt. % CNC suspension. The ionic strength of CNC suspension was adjusted by adding HEPES powder (20 mM). Tannic acid (20 mg) was then added to the suspension and the pH was adjusted to 8.0 with NaOH. The resulting mixture was stirred for 6-12 hours with magnetic stirring at room temperature. 5 mL Toluene was added to the suspension to form a biphasic system and toluene stayed on top of aqueous phase (FIG. 4a). Decylamine (1 mL) was then added and the resulting mixture stirred for 24 hour. The colored organic phase (top layer) (FIG. 4b) was separated and washed with water to remove any water-soluble salts or unmodified CNC particles. Toluene was then added to the organic phase and the mixture was vortexed or sonicated for 10 min. Then modified CNC particles were obtained by collecting the supernatant of the mixture upon centrifugation (500 rpm) (FIG. 4c).

The advantage of this phase transfer method is that no drying process is required and the immiscible solvent used will be the organic solvent that modified CNC particles are suspended in While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

FULL CITATIONS FOR DOCUMENTS REFERRED TO IN THE APPLICATION

1. Habibi, Y.; Lucia, L. A.; Rojas, O. J., Cellulose Nanocrystals: Chemistry, Self-Assembly, and Applications. *Chemical Reviews* 2010, 110 (6), 3479-3500.
2. Klemm, D.; Kramer, F.; Moritz, S.; Lindström, T.; Ankerfors, M.; Gray, D.; Dorris, A., Nanocelluloses: A New Family of Nature-Based Materials. *Angewandte Chemie International Edition* 2011, 50 (24), 5438-5466.
3. Moon, R. J.; Martini, A.; Nairn, J.; Simonsen, J.; Youngblood, J., Cellulose nanomaterials review: structure, properties and nanocomposites. *Chemical Society Reviews* 2011, 40 (7), 3941-3994.
4. Camarero Espinosa, S.; Kuhnt, T.; Foster, E. J.; Weder, C., Isolation of Thermally Stable Cellulose Nanocrystals by Phosphoric Acid Hydrolysis. *Biomacromolecules* 2013, 14 (4), 1223-1230.
5. Cao, X.; Dong, H.; Li, C. M., New Nanocomposite Materials Reinforced with Flax Cellulose Nanocrystals in Waterborne Polyurethane. *Biomacromolecules* 2007, 8 (3), 899-904.
6. Kalashnikova, I.; Bizot, H.; Cathala, B.; Capron, I., New Pickering Emulsions Stabilized by Bacterial Cellulose Nanocrystals. *Langmuir* 2011, 27 (12), 7471-7479.
7. Rincon-Torres, M. T. H., L. J., *Cellulose Nanowhiskers in Well Services*, U.S. patent application Ser. No. 13/561,158: 2012.
8. Klemm, D.; Kramer, F.; Moritz, S.; Lindstrom, T.; Ankerfors, M.; Gray, D.; Dorris, A., Nanocelluloses: A New Family of Nature-Based Materials. *Angewandte Chemie-International Edition* 2011, 50 (24), 5438-5466.
9. Abitbol, T.; Marway, H.; Cranston, E. D., Surface Modification of Cellulose Nanocrystals with Cetyltrimethylammonium Bromide *Nordic Pulp & Paper Research Journal* 2014, in press.
10. Habibi, Y.; Chanzy, H.; Vignon, M., TEMPO-mediated surface oxidation of cellulose whiskers. *Cellulose* 2006, 13 (6), 679-687.
11. Hasani, M.; Cranston, E. D.; Westman, G.; Gray, D. G., Cationic surface functionalization of cellulose nanocrystals. *Soft Matter* 2008, 4 (11), 2238-2244.
12. Gousse, C.; Chanzy, H.; Excoffier, G.; Soubeyrand, L.; Fleury, E., Stable suspensions of partially silylated cellulose whiskers dispersed in organic solvents. *Polymer* 2002, 43 (9), 2645-2651.
13. Siqueira, G.; Bras, J.; Dufresne, A., Cellulose Whiskers versus Microfibrils: Influence of the Nature of the Nanoparticle and its Surface Functionalization on the Thermal and Mechanical Properties of Nanocomposites. *Biomacromolecules* 2008, 10 (2), 425-432.
14. Lam, E.; Male, K. B.; Chong, J. H.; Leung, A. C. W.; Luong, J. H. T., Applications of functionalized and nanoparticle-modified nanocrystalline cellulose. *Trends in Biotechnology* 2012, 30 (5), 283-290.
15. Zoppe, J. O.; Habibi, Y.; Rojas, O. J.; Venditti, R. A.; Johansson, L.-S.; Efimenko, K.; Österberg, M.; Laine, J., Poly(N-isopropylacrylamide) Brushes Grafted from Cellulose Nanocrystals via Surface-Initiated Single-Electron Transfer Living Radical Polymerization. *Biomacromolecules* 2010, 11 (10), 2683-2691.
16. Peng, B. L.; Dhar, N.; Liu, H. L.; Tam, K. C., Chemistry and applications of nanocrystalline cellulose and its derivatives: A nanotechnology perspective. *The Canadian Journal of Chemical Engineering* 2011, 89 (5), 1191-1206.
17. Quideau, S.; Deffieux, D.; Douat-Casassus, C.; Pouységu, L., Plant Polyphenols: Chemical Properties, Biological Activities, and Synthesis. *Angewandte Chemie International Edition* 2011, 50 (3), 586-621.
18. Lee, H.; Scherer, N. F.; Messersmith, P. B., Single-molecule mechanics of mussel adhesion. *Proceedings of the National Academy of Sciences* 2006, 103 (35), 12999-13003.
19. Lee, B. P.; Messersmith, P. B.; Israelachvili, J. N.; Waite, J. H., Mussel-Inspired Adhesives and Coatings. In *Annual Review of Materials Research, Vol* 41, Clarke, D. R.; Fratzl, P., Eds. Annual Reviews: Palo Alto, 2011; Vol. 41, pp 99-132.
20. Sileika, T. S.; Barrett, D. G.; Zhang, R.; Lau, K. H. A.; Messersmith, P. B., Colorless Multifunctional Coatings Inspired by Polyphenols Found in Tea, Chocolate, and Wine. *Angewandte Chemie International Edition* 2013, 52 (41), 10766-10770.
21. Ejima, H.; Richardson, J. J.; Liang, K.; Best, J. P.; van Koeverden, M. P.; Such, G. K.; Cui, J.; Caruso, F., One-Step Assembly of Coordination Complexes for Versatile Film and Particle Engineering. *Science* 2013, 341 (6142), 154-157.

The invention claimed is:

1. A method of preparing hydrophobic cellulose nanocrystals (CNCs) comprising:
   a) coating CNCs with one or more plant polyphenols in an aqueous suspension to provide polyphenol-coated CNCs;
   b) grafting one or more hydrocarbons selected from an amine-terminated hydrocarbon and a thiol-terminated hydrocarbon to the polyphenol-coated CNCs to provide hydrophobic CNCs; and
   c) optionally, isolating the hydrophobic CNCs.

2. The method of claim 1, wherein the plant polyphenol is selected from one or more of tannic acid, aepigallocatechin gallate (EGCG), epicatechin gallate (ECG), epigallocatechin (EGC), gallic acid (GA) and pyrogallol (PG).

3. The method of claim 1, comprising one or more of:
   (a) an amount of CNCs in the aqueous suspension of about 0.5 wt % to about 5 wt %;
   (b) adjusting the ionic strength of the aqueous CNC suspension using a buffer;
   (c) a weight ratio of CNCs:polyphenol of about 5:1 to about 50:1;
   (d) coating the CNCs with one or more plant polyphenols by combining the CNCs with the one or more plant polyphenols at about room temperature and stirring for about 1 hour to about 24 hours; and
   (e) adjusting the pH of the suspension after addition of the one or more plant polyphenols to about 7 to about 9 using a base.

4. The method of claim 3, wherein the amount of CNCs in the aqueous suspension is about 1 wt % to about 3 wt %.

5. The method of claim 3, wherein the weight ratio of CNCs:polyphenol is about 10:1 to about 30:1.

6. The method of claim 3, wherein the CNCs are combined with the one or more plant polyphenols at about room temperature and stirred for about 3 hour to about 16 hours.

7. The method of claim 3, wherein the pH of the suspension after addition of the one or more plant polyphenols is adjusted to about 7.5 to about 8.5.

8. The method of claim 3, wherein the base is sodium hydroxide.

9. The method of claim 1, comprising one or more of:
(a) a weight ratio of CNCs:hydrocarbon of about 0.5:1 to about 10:1; and
(b) grafting the one or more hydrocarbons to the polyphenol-coated CNCs by combining the one or more hydrocarbons with the aqueous suspension comprising the polyphenol-coated CNCs at about room temperature and stirring for about 1 minute to about 24 hours.

10. The method of claim 9, wherein the weight ratio of CNCs:hydrocarbon is about 1:1 to about 5:1.

11. The method of claim 9, wherein the one or more hydrocarbons are combined with the aqueous suspension comprising the polyphenol-coated CNCs at about room temperature and stirring for about 5 minutes to about 12 hours.

12. The method of claim 1, comprising one or more of:
(a) adding a first organic, hydrophobic solvent to the aqueous suspension comprising the polyphenol-coated CNCs at about room temperature to provide a biphasic system comprising an organic phase and an aqueous phase;
(b) a weight ratio of CNCs:hydrocarbon of about 0.5:1 to about 10:1; and
(c) grafting the one or more hydrocarbons to the polyphenol-coated CNCs by combining the one or more hydrocarbons with the biphasic system at about room temperature and stirring for about 1 minute to about 24 hours.

13. The method of claim 1, wherein isolating the hydrophobic CNCs is performed using centrifugation or filtration.

14. The method of claim 13, wherein isolating the hydrophobic CNCs is performed by separating the organic phase from the aqueous phase, washing the organic phase with an aqueous solvent, adding a second organic hydrophobic solvent to the organic phase, separating solids and collecting the organic phase.

15. The method of claim 14, wherein the first and second organic hydrophobic solvents are selected from one or more of hexanes, heptane, toluene, chloroform, ethanol and methyl ethyl ketone.

16. The method of claim 1, wherein the one or more hydrocarbons are selected from one or more of amine-terminated alkyl, thiol-terminated alkyl, amine-terminated aryl and thiol-terminated aryl.

17. The method of claim 1, wherein the one or more hydrocarbons are selected from one or more of amine-terminated $C_{9-17}$alkyl, thiol-terminated $C_{9-17}$alkyl, amine-terminated $C_{6-20}$aryl and thiol-terminated $C_{6-20}$aryl.

18. The method of claim 1, wherein the one or more hydrocarbons are selected from one or more of amine-terminated $C_{9-13}$alkyl, thiol-terminated $C_{9-13}$alkyl, amine-terminated $C_{6-14}$aryl and thiol-terminated $C_{6-14}$aryl.

19. The method of claim 1, wherein one or more hydrocarbons are selected from one or more of decylamine, undecylamine, dodecylamine, decylthiol, undecylthiol, dodecylthiol, benzylamine and benzylthiol.

20. Hydrophobic CNCs prepared using the method of claim 1.

* * * * *